Figure 2:
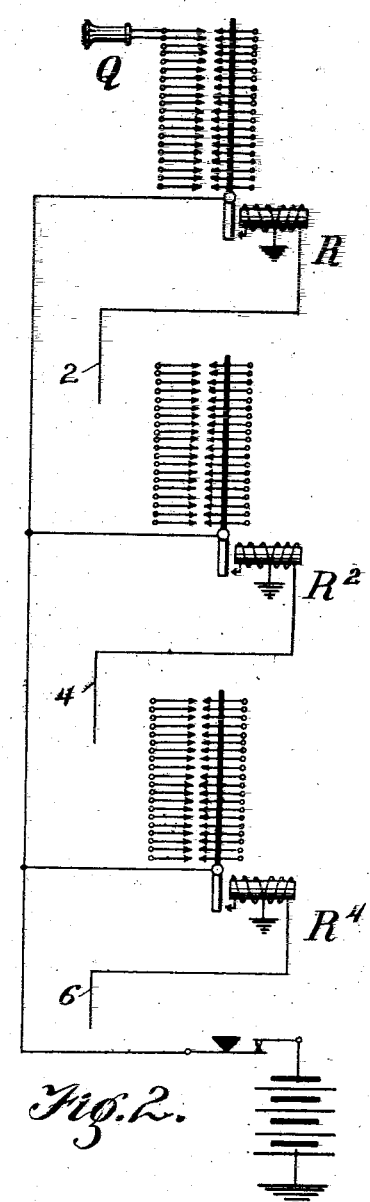

E. E. CLEMENT.
METHOD OF SELECTION IN SYSTEMS OF COMMUNICATION.
APPLICATION FILED OCT. 11, 1906.
939,188.
Patented Nov. 2, 1909.
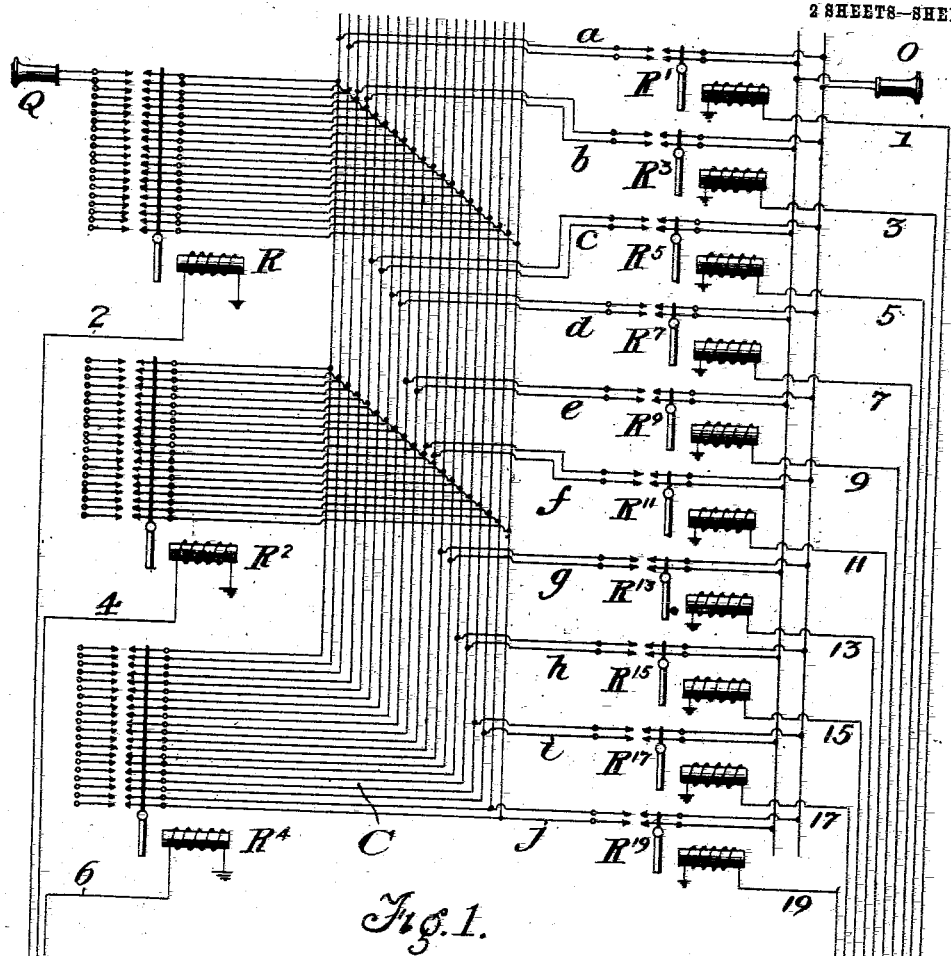
Fig. 1.
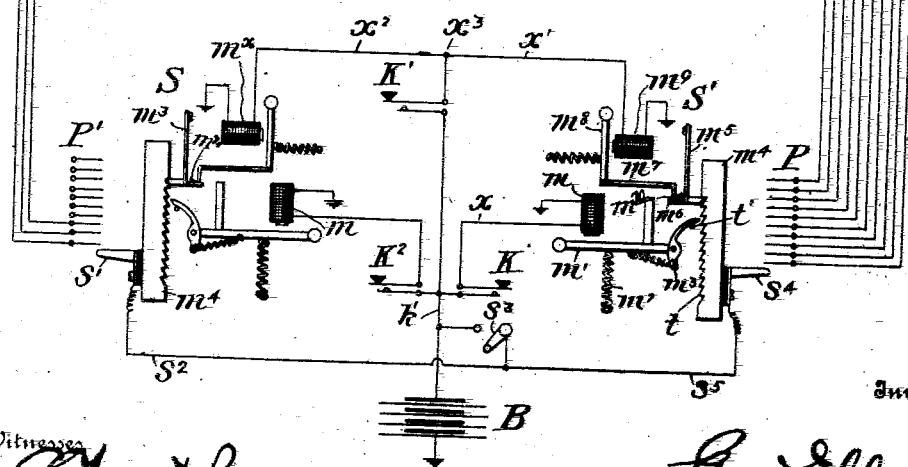

E. E. CLEMENT.
METHOD OF SELECTION IN SYSTEMS OF COMMUNICATION.
APPLICATION FILED OCT. 11, 1906.

939,188.

Patented Nov. 2, 1909.
2 SHEETS—SHEET 2.

UNITED STATES PATENT OFFICE.

EDWARD E. CLEMENT, OF WASHINGTON, DISTRICT OF COLUMBIA, ASSIGNOR TO THE NORTH ELECTRIC COMPANY, OF CLEVELAND, OHIO, A CORPORATION OF OHIO.

METHOD OF SELECTION IN SYSTEMS OF COMMUNICATION.

939,188.   Specification of Letters Patent.   Patented Nov. 2, 1909.

Application filed October 11, 1906. Serial No. 338,466.

*To all whom it may concern:*

Be it known that I, EDWARD E. CLEMENT, a citizen of the United States, residing at Washington, in the District of Columbia, have invented certain new and useful Improvements in Methods of Selection in Systems of Communication, of which the following is a specification, reference being had therein to the accompanying drawing.

My invention relates to systems of communication and has for its object the production of a simple and efficient method of selecting any one of a suitable number of pieces of apparatus or circuits to be affected in due course.

Briefly stated, my invention consists in making a combination of relays which control the apparatus or circuits in question, the number of relays being less than the total number of circuits or pieces of apparatus to be controlled. The relays are selected in proper combinations to pick out certain circuits by switches operated by circuit closers.

In the present case these circuit closers are illustrated and described as simple keys or push buttons and the switches comprise stepping magnets, separate series of contacts over which the wiper on each switch passes together with release mechanism for returning the switch parts to normal.

For the purpose of illustration I have shown one telephone circuit which may be connected to any one of thirty others through the agency of thirteen relays, three of which are group selecting relays and ten of which are adapted to select any one line in either of three groups. The group relays are connected to a switch and the line selecting relays are connected to a separate switch. For purposes of clearness and room I have shown only three group selecting relays but have shown a ten point switch for controlling. It will be understood that as many group selecting relays as there are points in the switch may be used. The underlying principle of the invention is this, that by requiring a circuit to be closed at two points in order to effect its completion, combinations may be made which are impossible where the circuit is only closed at one point.

In the present case I divide the thirty individual circuits into three groups of ten each which are normally disconnected from anything. Each group, however, goes to ten pairs of contacts on a relay which closes them all at once thereby connecting each circuit to a short branch, corresponding branches from all of the relays being connected together in parallel. The single circuit on the other side of the system which is to be connected to any one of the thirty mentioned is connected in multiple to pairs of contacts on all of the ten individual unit or line relays and the corresponding contacts are connected separately and respectively to the ten multiple branches of the three group relays.

Assuming that circuit 26 is to be connected to the common circuit, the circuit closer for the group selecting switch is pushed two times thus connecting the second point of the switch and battery to the second relay, the line relay selecting switch is then pushed six times thus putting battery upon the 6th single or unit relay. If battery were at this time on the circuit each one of the relays would be selected as the switch rods were stepped up but I purposely keep that battery off of the line until after the relays have been selected and then throw battery on the line by a suitable switch. As soon as this is done it will be seen that the circuit is thus closed through #2 branch of the group relay and through #6 extension of the 6th single relay which is the only one of the group that is closed all the way through. It is obvious that the battery should be disconnected before the release magnet is operated.

Further objects and advantages will be set forth hereinafter and particularly pointed out in the appended claims.

Figure 3:
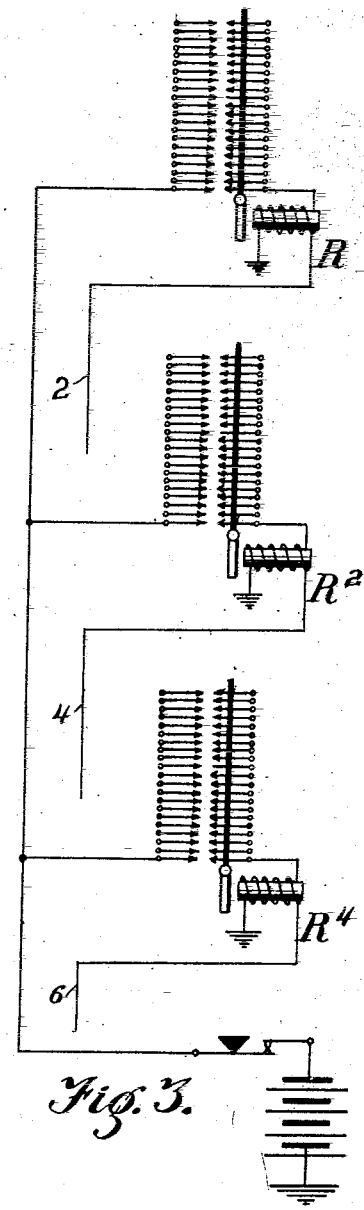

My invention is illustrated in the accompanying drawing in which: Figure 1 is a diagram showing one embodiment of my invention; Fig. 2 is a view illustrating a locking circuit; Fig. 3 is a view showing a modified form of locking circuit.

Referring to Fig. 1, the diagram shows thirty line terminals on one side, any one of which can be selected and connection effected therewith from the other side. In this diagram I have shown three relays marked respectively R R² and R⁴ each of which controls ten pairs of contacts. These I call the "tens" relays. On the other side I have shown ten relays marked R′, R³, R⁵, R⁷, R⁹, R¹¹, R¹³, R¹⁵, R¹⁷ and R¹⁹, which I shall call "units" relays. Each of these relays controls a single pair of contacts. The reason for showing a pair of contacts is that the circuits controlled by the relays are metallic. The tens relays are connected by wires 2, 4 and 6 to the three lowermost points on the switch S and the switch contact $s'$ is connected by wire $s^2$ and switch $s^3$ to the battery B which is grounded as is also the opposite side of the relays R, $R^2$ $R^4$, etc. The units relays $R'$, $R^3$, $R^5$ etc. are connected through wires 1, 3, 5, 7, 9, 11, 13, 15, 17 and 19 to the ten contact pens P respectively of the switch $S'$ whose contact wiper $s^4$ is connected through to battery B by the wire $s^5$ and the switch $s^8$.

The switches S and $S'$ are similar in every respect and in describing them I will refer to the switch $S'$ because all of the contact pens are utilized whereas with the switch S only three of the contact pens are used in this instance. A magnet $m$ grounded upon one side is connected to the battery B through a key K and a wire $k'$. Pivoted in proper relation so as to be magnetized by the core of the magnet $m$ is an armature $m'$ normally retracted by a spring $m^2$ and carrying upon its outer end a spring pressed pawl $m^3$ adapted to engage and step up the switch rod $m^4$ which carries the contact wiper $s^4$. As the rod $m^4$ is stepped up it is engaged by a locking pawl $m^5$ provided with a rearwardly projecting tongue $m^6$ engaged by the projecting arm $m^7$ of the armature $m^8$. This armature $m^8$ is controlled by the release magnet $m^9$. The operation of the switch is as follows: When the key K is depressed, battery current is put upon the magnet $m$ by the following circuit: battery, $k'$, K wire $x$, magnet $m$, and ground. The magnet thus energized attracts its armature $m'$ and throws the pawl $m^3$ into engagement with one of the ten teeth $t$ on the rod $m^4$ thus stepping it up so that its wiper $s^4$ contacts with the first pen in the group P. When the key is released the armature $m'$ drops back to normal position and is held out of engagement with the teeth by a stud $t'$; the rod carrying the wiper $s^4$ is held in this position by the locking pawl $m^5$ until the key $K'$ controlling the release magnet is pressed, at this time the following circuit is closed: battery B, $k'$, wire $x'$, magnet $m^9$ and ground. The magnet $m^9$ thus being energized attracts its armature $m^8$ and throws the arm into engagement with the rearwardly projecting tongue $m^6$ on the locking pawl $m^5$. This throws the locking pawl out of engagement with the switch rod $m^4$ and allows it to drop by gravity. It will thus be seen that any relay connected through this switch is then deënergized and the circuit control thereby broken. Having described the operation of the switches I will now proceed to describe the connection between the switches and the different sets of relays: Between the two sets of relays a cable C passes which is composed of ten pairs of wires which may be designated by the letters $a, b, c, d, e, f, g, h, i, j$, which are connected and disposed as follows: All of the pairs are multipled to the ten pairs of contacts on each of the tens relays R, $R^2$ and $R^4$. Thus the first pair $a$ goes to the first pair of contacts on each of the relays R, $R^2$ and $R^4$. The second pair $b$ goes to the second pair of contacts on each of these relays, and so on. The corresponding or coöperating contacts of the relays are connected to the individual lines or circuits to be selected, thus, in the relay R appear the terminals of lines #1 to #10, in relay $R^2$ appear the terminals of lines #11 to #20, and in relay $R^4$ appear the terminals of lines #21 to #30.

Each of the pairs $a, b, c$, etc., is connected to the single pair of contacts. One of the units relays $R'$, $R^3$, $R^5$ etc. Thus the pair $a$ appears only in the relay $R'$, and the pair $f$ appears only in the relay $R^{11}$, etc. I have shown the contacts of the units relays connected on one side to a common circuit 12; to which is connected a telephone Q. I have shown line #1 which is the first outside line on the relay R, connected to a telephone Q and it is to be understood that all the other terminals may be connected to similar telephones or any desired apparatus.

The operation of selecting any one of the lines represented on the tens relays is as follows: Suppose it be desired to connect the telephone O with the telephone Q; the line circuit leading to Q is #1 which appears only in the terminals on relay R, hence the operator presses the key $K^2$ to step the rod with its wiper $s'$ up to the first contact pen in the group $P'$, thus energizing the relay R through the following circuit: battery, wire $s^2$, wiper $s'$, the first contact pen in the group $P'$, wire 2, relay R and ground. The relay R in pulling up connects all of the lines #1 to #10 on to the pairs of wires $a, b, c, d$, etc., in the cable C. As these pairs are distributed among the relays $R'$, $R^3$, $R^5$, etc., it follows that we have thus connected the lines #1 to #10 to the relays respectively from $R'$ to $R^{19}$ and by energizing any one of these relays we may select any one of the individual lines which have thus become connected. In the present instance the operator closes the key K once thus connecting the battery to the magnet $m$ by the following circuit: battery B, wire $k'$, key K, wire $x$, magnet $m$ and ground. The magnet thus energized steps up the switch rod $m^4$ and connects the wiper with the first contact pen in the group P thus connecting the relay $R'$. The switch $s^3$ is now closed thus putting battery upon the relays R and $R'$ through the following circuit to the relay R: battery B, switch $s^3$, wire $s^2$, wiper $s'$, the first contact pen in the group $P'$, wire 2, relay R and ground; and to the relay $R'$ through the following circuit: battery B, switch $s^3$, wire $s^5$, wiper $s^4$, the first contact pen in the group P, wire 1, relay R' and ground. Thus both relays R and R' are energized and connect the respective telephones O and Q and as long as the switch $s^3$ is held upon its contact point to close the circuit of the relays this connection will remain established. As soon as the switch is moved to break the circuit the relays are deenergized and the circuit disconnected. The operator then restores the switches by pressing the key K' which puts current upon the magnets $m^9$ and $m^x$ by the following circuit: battery B, wire k', key K', wire $x^2$, magnet $m^x$, and ground—and on the other side by the same circuit to the point $x^3$ and thence by wire $x'$, magnet $m^9$ and ground; thus through the divided path $x'$ $x^2$ both magnets $m^9$ and $m^x$ are energized retracting the locking pawls $m^3$ and $m^5$ in the switches S, S' respectively and allowing the switch rods $m^4$ to drop by gravity and disconnect the wipers $s'$, $s^4$ from the contact pens.

To take another example, suppose it be desired to select and connect with line #17; the switch S is stepped up two points so that it is connected with wire #4 through the relay $R^2$, and ground and the switch S' is stepped up seven points or until the wiper $s^4$ is upon the seventh contact pen in the group P. This puts the relay $R^{13}$ in readiness to connect with the pair $g$. When the switch $s^3$ is closed both relays $R^2$ and $R^{13}$ are energized and the circuit for line #17 is completed. The release of these magnets and the release of the switches are the same as before described.

It will be understood that the switches, keys, and relays shown herein are merely used for the purposes of illustration, the invention not lying in the switches which have been disclosed in a co-pending application Serial No. 296,853, filed January 19, 1906, or in the relays, but in the arrangement of the tens and units relays, and their circuits with the switches for connecting them and all used in the various combinations so as to produce as great total of possible selections and connections as is possible with the number of relays and switches involved. It should be observed that the relation of these relays is not limited to simply decimal relation. Thus, the number of contacts carried on the relays R, $R^2$, etc., is limited only by the requirements of good practice and the possibility of obtaining sufficient power in the actuating electromagnets. The number of these relays is not limited nor is the number of relays R', $R^2$, etc. For example, twenty relays R, $R^2$, etc., could be provided each of which had its ten pairs of contacts multiplied in any manner similar to those in the figure. Any one of two hundred lines could thus be selected by increasing the contacts on the switches or ten relays R, $R^2$, etc., could be provided each with twenty pairs of contacts. It would then be necessary to provide twenty pairs of contacts in the cable C and twenty individual relays $R$, $R^3$, etc., and twenty contacts in each switch.

Numerous other changes and arrangements might be resorted to without departing in any way from the spirit or scope of the invention and all such changes are contemplates by me and are considered to be within the purview of the appended claims.

I have described my controlling relays as single wound, and depending entirely upon the selective circuit closers. By providing each relay with a second winding as shown in Fig. 2, and a pair of controlling contacts therefor on its armature, and by running a common battery wire to all of these contacts, each relay may be made to close its own circuit when it is energized, so that it will remain energized as long as the common battery locking wire is intact. To unlock the relay I place a key in this common battery wire so that it may be opened at will for restoring purposes. A still simpler arrangement, which is also self-locking, is to connect one of the contacts on the relay armature with the battery wire, and the other with a point on the battery side of the single winding, as shown in Fig. 3. Thus a temporary closure of the relay circuit through the controlling device will cause it to pull up and maintain the battery connections on its single winding as long as the locking wire is intact. Such self-locking relays are well known in the art, but their application to my type of selecting system I consider involves invention, and I shall therefore claim the combination.

Having thus described my invention what I claim and desire to secure by Letters Patent is:

1. In an electrical system the method of selection and connection of a predetermined circuit which consists in successively segregating groups of circuits until a group is found which contains the desired unit, associating this group with an intermediate agency common to all the groups and successively segregating the units in said intermediate agency until the unit is found which corresponds to the desired unit circuit in the segregated group, and finally associating this unit with a single agency common to all the groups and units.

2. In an electrical system the method of selection and connection of a predetermined circuit which consists in successively segregating groups of circuits until a group is found which contains the desired unit, associating this group with an intermediate agency common to all the groups and successively segregating the units in said intermediate agency until the unit is found which corresponds to the desired unit circuit in the segregated group, maintaining all other groups and all other units in the intermediate agency disabled, and finally associating the selected unit with a single agency common to all the groups and all the units.

In testimony whereof I affix my signature in presence of two witnesses.

EDWARD E. CLEMENT.

Witnesses:
  E. EDMONSTON, Jr.,
  JAMES H. MARR.